United States Patent [19]

McCormack

[11] Patent Number: 4,726,007
[45] Date of Patent: Feb. 16, 1988

[54] COMPACT DISC DAMPER AND METHOD

[76] Inventor: Steven A. McCormack, c/o The Mod Squad 542 Coast Hwy., Leucadia, Calif. 92024

[21] Appl. No.: 881,808

[22] Filed: Jul. 3, 1986

[51] Int. Cl.$^4$ .................. G11B 7/26; G11B 23/00; G11B 25/04
[52] U.S. Cl. .................. 369/286; 369/288; 369/292
[58] Field of Search ............ 369/292, 273, 274, 289, 369/271, 258, 283, 284, 286, 288

[56] References Cited

U.S. PATENT DOCUMENTS

| | | | |
|---|---|---|---|
| 778,492 | 12/1904 | Johnson | 369/271 |
| 3,997,174 | 12/1976 | Kawashima | 369/271 |
| 4,012,048 | 3/1977 | Hawkins | 369/271 |
| 4,218,065 | 8/1980 | van der Hoek et al. | 369/271 |
| 4,260,161 | 4/1981 | Frank | 369/271 |
| 4,332,839 | 3/1982 | Yamashita et al. | 369/284 |
| 4,435,801 | 3/1984 | Levin | 369/284 |
| 4,499,477 | 2/1985 | Davies et al. | 369/284 |

Primary Examiner—Steven L. Stephan
Attorney, Agent, or Firm—Robert B. Block

[57] ABSTRACT

A damper disc made of material having significant loss to vibration and low sound propagation velocity is arranged to be laid over a CD disc and in good contact with its upper surface to suppress and dissipate vibrational energy from the CD disc. The damper is also light opaque and light absorptive. Specific suitable materials are disclosed as well as an embodiment suitable for making the damper available as an after market accessory, and integral part of the CD player, or as an integral part of the CD disc.

23 Claims, 7 Drawing Figures

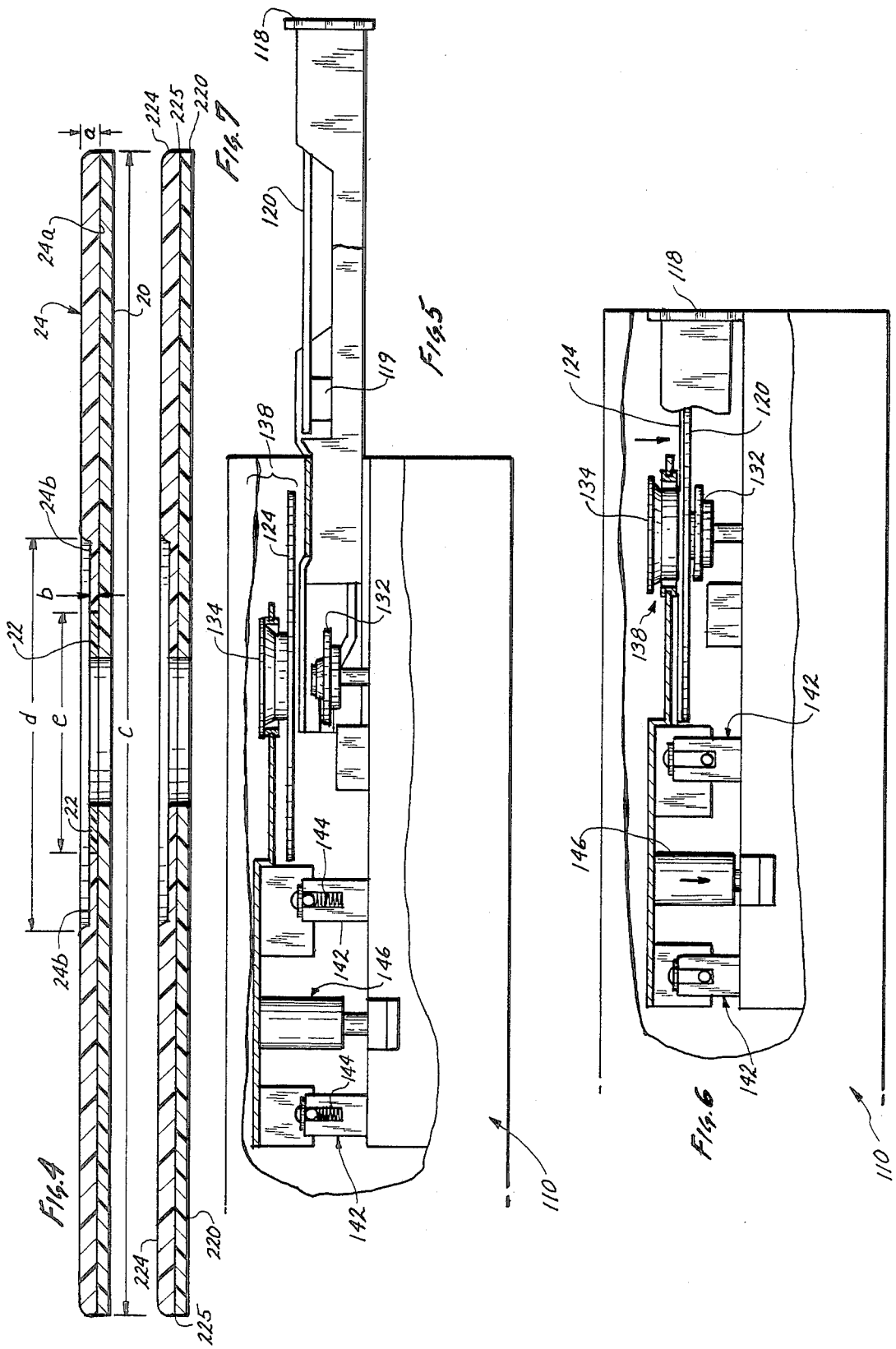

COMPACT DISC DAMPER AND METHOD

BACKGROUND OF THE INVENTION

This invention relates to the accurate reproduction of information stored on optically encoded disks (CD disks). More particularly, the invention relates to an improved damper system and method for use with compact (CD) disks and CD players to obtain high fidelity reproduction of music.

The compact disc and CD player operate by digitally sampling the information or music source, and recording the sampled signal as a series of pits and lands of variable lengths formed on a polycarbonate plastic substrate coated with an aluminum reflective coating and protected by a layer of clear lacquer. A land is the surface of the substrate between the pits. Usually this digitally sampled information is represented by the transitions between the pits and lands or vice versa, and by the absence of transitions. These transitions and absences of transitions become the ones and zeros of the digital representation of the music. A modulation coding and formatting arrangement is used for organizing this digital data for compact storage and for error reduced recapture. It has become an audio standard to record and read the disc along a spiral track at a constant linear speed by rotating the disc at variable speed.

In playback, a laser beam is directed at the disc and will experience changes in the reflective light pattern during transitions from pits to lands. These changes are decoded as ones and the absence of change is decoded as zeros, the number of which depends on the length of the pit or land.

Even though the CD disc has a very high theoretical capability for high fidelity reproduction when sufficiently high effective sampling rates are employed, the musical quality of CD players has nevertheless been found limited. To some, the resultant sound quality is described as harsh, grating, lacking in musical naturalness, piercing, boomy, as having a notable loss of sound stage and presence and a general lack of naturalness.

A wide variety of improvements has been proposed to cure these deficiencies, all of which generally are directed at some specific problem. A list of improvement features includes special sampling techniques, improved A/D converters, improvements in filters, special modulation codes, particular formatting, phase shift compensation, anti-aliasing filters, separation of laser and spindle mechanisms from signal electronics into differently housed components, improved audio cables of special construction, special turntable supports such as isolating platforms for minimizing the effects of vibration and many more. The vibration caused by audio feedback and stray light have been implicated in some tests regarding audio quality degradation. Proposed vibration cures include improved subchassis construction, special suspensions, and special CD player support tables which claim to help isolate vibration caused defects. In general, CD players have been said to possess immunity to such effects, but the proposed improvements all seem to make a subtle improvement in the sound quality. Indeed, another cause of audio quality degradation may involve an inter-modulation interaction between the vibration induced fluctuations in the drive current requirements for the tracking servos which are working to remove such fluctuations as reflected into the digital circuitry and analog electronics through common connections such as power supplies.

There is therefore a need for an improved CD disc playing system which will contribute to achieving a more natural, listenable, and satisfying CD disc reproduction, especially of musical material.

SUMMARY OF THE INVENTION AND OBJECTS

It is a general object of the present invention to provide a compact disc damper for use with CD disc players and method which will overcome vibration and stray light caused problems and provide a more listenable sound quality from compact disc musical recordings.

It is a further object of the invention to provide a compact disc damping system and method of the above character which improves the performance of the player by reducing transmission of high frequency vibrations within the compact disc.

A further object of the present invention is to provide a compact disc damper and method of the above character which provides a direct improvement in freedom from error in the digital readout of CD players by a reducing focusing servo operational requirements and refocusing current and associated inter-modulation noise caused by reflection of these current changes through the power supply and into the remaining digital and audio circuitry.

A further object of the present invention is to provide a compact disc damper and method of the above character which stops light leakage in the playing system from causing imprecision of received signal.

It is a further object of the present invention to provide compact disc damper and method of the above character in which a perceivable improvement in the sound stage of reproduced music is obtained and in which the instruments are more precisely clearly spatially oriented.

A further object of the present invention is to provide a compact disc damper and method of the above character in which the natural spaciousness and power of the reproduced signal is achieved while simultaneously reducing any tendency toward a booming sound character.

A further object of the invention is to provide a compact disc damper and method which enables the reproduced sound to have a more coherent overall character with higher resolution of instruments and notes, and in which the spectral balance is more natural so that the improvements in sound stage and spatial location of the instruments are accompanied by a natural and audible decay of notes, particularly bells and strings, which has heretofore been lost.

The improvements achieved by the disc damper and method of the present invention are supported by some of the research relating to the improvements in audio quality of compact disks and CD players which has shown that the high frequency resolution improvements can be measured with appropriate test equipment and which shows that other vibration control techniques have measurably improved the sound character and quality of reproduction.

The present invention in general employs a damper made of substantially rigid, sound absorbing and low-transmissive (dead) material which is shaped as a disc and which is mounted to lie in close contact on the top of the CD disc. This material accepts and suppresses vibrational energy in the CD disc and dissipates it in such a way that the propagation of these vibrations is substantially diminished and therefore not able to degrade the sonic performance of the CD player and disc. It is believed that the damper changes mechanical Q of the system and the resonance characteristics in such a way as to disperse or shift the resonances upward to higher frequency components of lower amplitude.

In general, it is difficult to envision a way to incorporate a sound dead material in the manner just suggested because of the fact that CD playing machines are not standard in many respects. Heretofore, there has been no way to reliably register a damping element to the CD itself and if not properly centered on the disc, problems caused outweigh the advantages achieved. The manner in which clamps have been devised for fitting over the CD disc in a player are quite variable, some utilizing what are called floating centers while others applied pressure either mechanically or by magnetic coupling with the spindle of the machine. The magnetically operated clamps of course become less effective if they are separated from the counterpart magnetic element by more than the designed separation. Accordingly, in the aftermarket form of the present invention the rigid disc maybe given an interior recess which selectively provided with a shoulder less than about 0.010 inch so as to be used in the machines having magnetic clamps.

The disc is made out of selected sound dead materials which exhibit a low Q, i.e., have significant internal loss and thus are absorbent to audio or sound vibrations, and which have preferably a low sound propagation velocity. Examples of plastic materials possessing these characteristics are given such as glass or carbon fiber filled epoxy commonly used in the production of PC circuit boards. Additionally, the disc maybe made opaque and absorbent to light so that it absorbs and does not transmit light scattered from the CD disc with which it is used.

In one preferred form of the invention the damper disc hereof is constructed and arranged for after market use by being supplied to the consumer together with a plurality of centering rings each of which is to be installed on each respected compact disc in the owner's collection. The installation of the centering ring is quite simple since the typical carrying case for a CD disc has a spindle-like rosette of fingers for supporting the same which also can serve as a guide for installation of the centering ring which adheres to the compact disc with a suitable adhesive. After installation of the centering rings the disc damper of the present invention is merely laid on the CD disc in registry with the centering ring and the damper and CD disc are installed in the machine for playing in the usual way. The dimensions of the damper of the present invention are so arranged as to not be an undue load on the drive mechanism of the typical CD player.

In another embodiment of the invention the damper is made a part of the CD player mechanism itself and it can be carried by a mechanism towards and away from the CD disc drive spindle along with the clamp.

Of course, it is possible to incorporate the damper of the present invention into the CD disc structure itself which would be an extremely effective way to carry out the present invention and is shown in a third embodiment.

These and other objects and features of the present invention will become apparent from the following description and claims when taken in conjunction with the accompanying drawings of which:

BRIEF DESCRIPTION OF THE DRAWINGS

FIG. 4 is a cross-sectional view through a CD disc with centering ring and the installed damper as the assembly thereof is completed and ready for insertion into the CD player as shown in FIG. 1.

FIG. 5 is a cross-sectional view with portions broken away and portions thereof shown in cross section of another embodiment of the invention in which a CD player is modified to include an integral damper as part of the playback mechanism, constructed in accordance with the present invention.

FIG. 6 is an elevational view of the player of FIG. 5 showing the CD tray pushed home and the CD disc being engaged by the centering drive spindle from beneath and the integral damper and clamp from above during the playing cycle.

FIG. 7 is a cross-sectional view of the CD disc of a construction modified in accordance with the third embodiment of the present invention in which a self-contained damper structure is integrally formed with the CD disc.

DETAILED DESCRIPTION OF THE PREFERRED EMBODIMENTS

Figure 1:
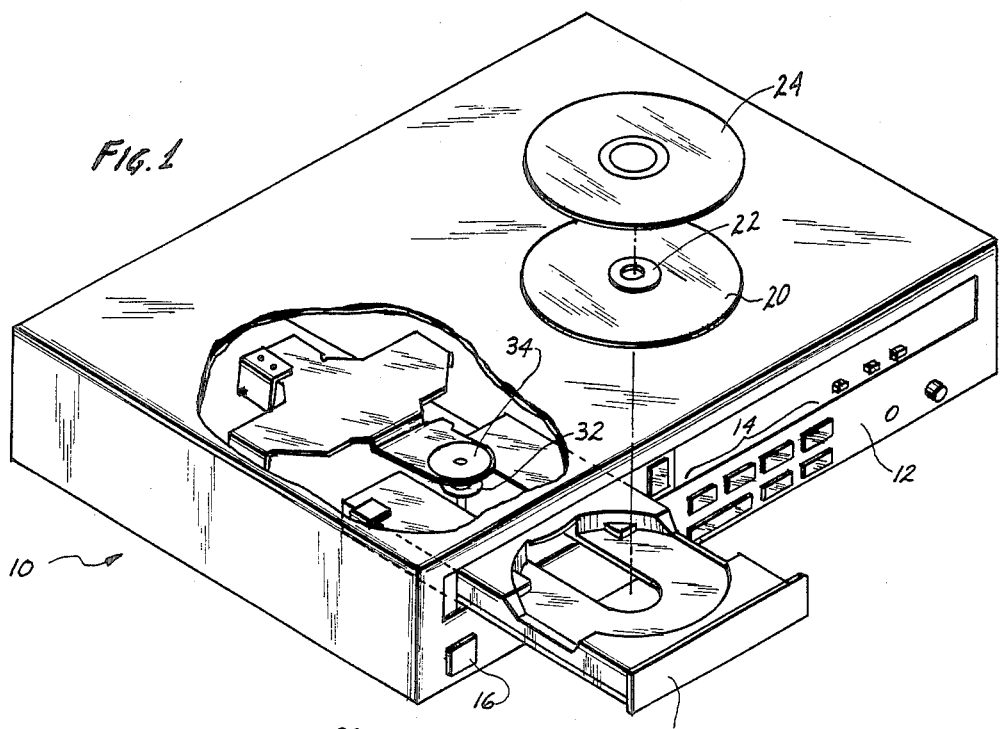
FIG. 1 is a perspective view partially broken away of a typical CD player showing the disc tray extended and the damper disc of the present invention being aligned in registry on a CD disc for insertion into the player.

Referring now to FIG. 1 there is shown a CD player 10 of a conventional type having a front panel 12 with controls 14 including an eject button 16 for opening a tray 18 into which a CD disc 20 is normally placed. In addition a centering ring 22 is attached to the top of the disc 20 so that a CD damper 24 constructed in accordance with the present invention can be laid on top of the disc 20 in registry with the spindle hole 26 normally provided therein.

Figure 3:
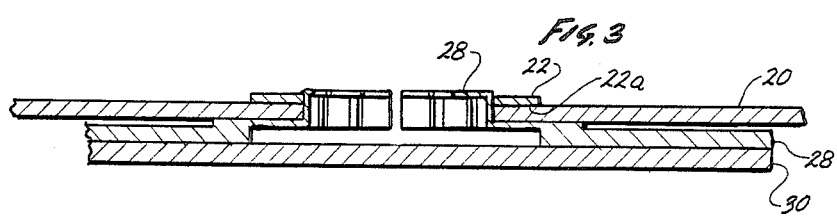
FIG. 3 is cross-sectional view through the assembled centering ring, CD disc and case after the assembly of FIG. 2 is complete.

The centering ring 22 is provided with an annular and flat shape resembling an ordinary flat washer. Means are provided for attaching the ring to the CD disc and preferably consists of an adhesive layer disposed on the lower side 22a of the ring so that the latter can be dropped on the circular rosette of the mounting fingers 28 of a typical CD disc case 30 where it is brought into exact alignment with the CD disc spindle hole 26. Pressing the ring down firmly at that point will permanently attach the ring to the upper surface of the CD disc as shown in FIG. 3.

The damper 24 of the present invention fits right over the centering ring 22 and lays on top of the CD disc 20 as shown in FIG. 4. The damper bottom surface 24a is preferably flat or given a shape to assume a flat configuration when pressed onto the CD disc, as will be explained.

The damper is preferably in the form of a circular disc having the same dimensions as the CD disc on which it is to be used and extending inwardly to cover all of the tracks of the CD disc.

The inside section 24b of the damper in this embodiment is relieved or recessed down to the thickness of the ring 22. This recess is thin enough together with the ring to permit satisfactory operation with those CD player spindle clamps which utilize a magnetic attraction force to pull them into pressured contact with the disc and spindle. Typically a recess section 24a and ring thickness of about 0.025 inches or less is found satisfactory in this regard.

While the damper is specified as flat, by this it is meant to include not only absolute flatness of configuration but also those related useful configurations which can be brought into flatness by the application of slight pressure. Such shapes include downwardly concavely facing shape of the right circular cone of small angular inclination (<1°) 1-2° from 180° constructed in the manner of a Bellevue washer (an inverted shallow cone) which can readily deform into a flat shape with very good surface contact with the underlying surface when it is pushed down with modest pressure as will occur when the CD player clamp (especially if mechanically driven) is pressed down over the assembled spindle 132, CD disc 20, and damper 24.

The material of which the damper is made is critical. The material should be absorptive to both vibration and sound waves and to optical radiation. In the case of sound waves, this means that the energy be absorbed in a given volume should be high relative to the energy contained therein (a low Q material) and that the propagation velocity for sound waves of the material should be as low as possible. Such materials are normally perceived or seem as dead (nonringing) when sound is launched in them, as when struck. Examples of such materials can be found among certain plastics such as glass fiber or carbon fiber reinforced epoxy plastic as is presently used in the construction of printed circuit boards; the solid fluorocarbon plastics such as polytetrafluoroethylene (Teflon); Delrin, and nylon. Most plastics can be compounded with fillers such as fiber glass or carbon fibers which will usually assist in making a better sound dead material. The carbon fiber filled epoxies are generally described by specifications FR4 or G10 for printed circuit boards are entirely satisfactory here.

Solid Teflon and Delrin are stiff and rigid at low audio frequencies but possess high loss and low propagation velocity at higher frequencies. In principle, lead and tin would be acceptable materials, both being relatively dead when tapped or struck. High Q metals (brass, berrylium, copper, etc.) and solid glasses of any kind are unsuitable. The elastomers such as butyl rubber or urethanes are considered less satisfactory as they are not rigid enough.

Polycarbonate plastics (of which CD disks are commonly made) and acrylic plastics suitable as damping materials in accordance with this invention when compounded with appropriate fillers.

Of the suitable plastics nearly all can be compounded to be highly opaque and preferably dark so as to be significantly absorbent to stray light radiation and thus minimize leakage of such radiation within the playing system.

An example of one set of satisfactory dimensions are here given in relation to the lettered items A through E of FIG. 4 for a typical damper and are as follows:

a=0.045"−0.050" (1.143−1.27 mm)
b=0.025" (0.635 mm)
c=4.700" (119.38 mm)
d=1.750" (44.45 mm)
e=0.95" (24.257 mm)

The disc 24 is flat ±0.001" edge to edge.

Where possible within machine dimensional constraints it is desireable that the disc damper have an overall diameter at least as large or even larger than the disc itself. Some machines may require the disc damper to be smaller, but this should be held to the minimum possible.

The ring 22 has a thickness b, an inside dimension the same as the CD disc, and an overall diameter about 0.005" less than dimension e, given above.

In operation, an adaptor ring 22 is attached to every disc in the owner's collection. One such disc 20 and case 30 is opened for playing (as in FIG. 3). The damper is laid on top of the CD disc 20 where it registers with the ring 22 (FIG. 4). The assembly of the CD disc with the ring and damper is laid into the tray 18 of the CD player (FIG. 1), the tray is closed so that the spindle and floating clamps 34 support the assembly of CD disc 20, ring 22, and damper 24, and playing proceeds. The clearances of most CD players will permit the foregoing without modification. Most CD players with magnetic clamps will also work satisfactorily without modification due to the thin section of the recess 26a and ring 22.

If, in the construction of the CD player, the spindle were made about 0.050" taller, it would be possible to provide a damper disc for after market use without resort to the use of centering rings, the disc being extended radially inward to the same dimension as the CD disc spindle hole.

Figure 2:
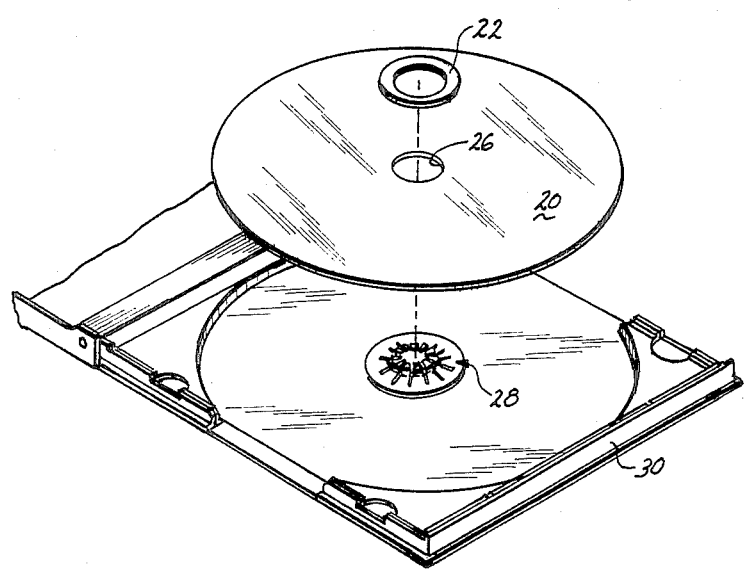
FIG. 2 shows a typical CD disc case with the adaptor ring ready to be placed on the CD disc and aligned on the case centering fingers.

Referring to FIGS. 5 and 6 there is shown another embodiment of the invention in which the damper 124 is incorporated as part of the CD player mechanism, the numbering being the same as in FIGS. 1-3 with like parts being raised by 100. Thus the tray 118 is shown in FIG. 5 is extended for receiving the CD disc 120 in the usual manner. The player 110 includes a spindle 132 for rotating the CD disc 120 and a clamp assembly 134 carrying a damper 124 constructed in accordance with the present invention. The clamp 134 is designed for being dropped down together with the damper 124 and engaging the CD disc 120 and spindle 132. The damper 124 is fabricated to be attached internally of the player with the clamp as a unitary assembly 138 which is carried on an armature 140 mounted on a multiple point bearing suspension 142 for vertical movement parallel to, and towards and away from the CD disc. Return springs 144 bias the assembly in an up position and means, such as a solenoid 146 is provided to pull the carriage assembly down and thereby lower the damper and clamp assembly 138 in contact with the CD disc. The damper and clamp may be carried in the armature in a number of ways as by being set in a floating collar in relation to the armature or they may be carried by any of the other systems commonly employed such as a high quality bearing (not shown). The clamp also is provided with means for registering, with the CD disc 120 and spindle 132 and therefore in axial alignment also registers the damper 124.

In the embodiment of FIGS. 5 and 6 the damper can be constructed as shown in either FIG. 4 or FIG. 7 (the latter not employing a centering ring) and can be made with or without the relief recess required for use with magnetic clamp systems depending on whether if the same are employed in the player 110 construction.

In the operation of the apparatus of FIGS. 5 and 6 the ordinary CD disc is loaded in with the tray 118 which is pushed into the player. As the tray 118 reaches the inner limit locating tabs 119 are pulled downward to leave the CD disc on the drive spindle 132. Simultaneously, the clamp and damper assembly 138 is lowered into contact with the top of the CD disc so that some pressure is applied to it and the spindle to keep the CD disc from slipping. Playing then proceeds as usual.

It should be realized that all of the embodiments of the present invention involve changing the CD disc assembly in the player to a different mechanical system of higher mass and changed resonance. More vibration and resonance modes are created and they are found to lie outside the range where they could cause problems so that energy entering such modes dissipates harmlessly.

While the term damper is applied to the present invention, it is not intended to suggest that any positive flywheel effect is achieved. Generally, it would be desirable to keep the moment of inertia of the damper as low as possible so that the damper will have minimum effect on the player drive mechanism at least for aftermarket use. This consideration eliminates metals as preferred damper materials unless the player is originally designed to accommodate their mass.

Referring now to FIG. 7 there is shown another application of the present invention in which the damper is added to and made a part of the CD disc 220 itself in which like parts are given the same numbers as in FIGS. 1 to 3 raised by 200. Thus a damper 224 is made with the materials as disclosed heretofore and is adhered to the top of the CD disc with an adhesive layer at 225. Alternatively, if the plastic of the damper 224 will form a bond with the CD disc 220 material, the damper 224 can be bonded directly to the CD disc during the CD production process.

What is claimed is:

1. A damper assembly for optically encoded discs of the type having a spindle hole for being supported on a player spindle with a lower surface a read head and an opposite upper surface comprising,
    a flat circular damper disc made of a material of sufficient thickness to be substantially rigid and self-supporting for lying on the upper surface of said disc in acoustic and vibration coupled contact therewith,
    said damper being made of a material having significant internal loss at higher frequencies and low sound propagation velocity,
    a centering ring having an inner radius equal to the spindle hole in the disc and an outer radius extending a short distance towards the perimeter thereof,
    means for securing the centering ring to the upper side of the disc in alignment with the spindle hole,
    said damper having an inside radius equal to the outside radius of said centering ring so that said damper can be laid on top of the disc in registry with the alignment ring and be inserted with the disc into a player.

2. A damper assembly as in claim 1 wherein said disc is made of plastic.

3. A damper assembly as in claim 1 wherein said disc is made of glass fiber or carbon fiber filled epoxy plastic.

4. A damper assembly as in claim 1 wherein said disc is made in a predetermined thickness about the same as the thickness of a compact disc and has an extent covering substantially the entire diameter of said compact disc.

5. A damper assembly as in claim 4 wherein said damper disc has a substantially reduced thickness from the inner track of the disc inwardly to form a recess to accommodate use of magnetic clamps.

6. A damper assembly as in claim 2 wherein said plastic is made of a solid fluorocarbon plastic.

7. A damper assembly as in claim 2 wherein said plastic is solid Delrin plastic.

8. A damper assembly as in claim 1 in which said disc is configured with a righ circularly conical shaped facing concavely downwardly towards said disc having a shallow angle of less than about one degree so that when centrally clamped to said disc it can be deformed into flat, close contact with said disc.

9. The damper assembly as in claim 1 in which said means for securing centering ring is an adhesive layer formed on the lower surface of said ring.

10. The damper assembly as in claim 1 wherein said damper disc is made of an opaque and optically absorptive material.

11. In a player of the type having a spindle for supporting and turning an optically encoded disc by engagement of the disc through a central hole therein,
    a flat circular damper disc made of a material of sufficient thickness to be substantially rigid and self-sporting for lying on the upper surface of said encoded disc in acoustic and vibration coupled contact therewith, said damper disc being made of a material having significant internal losses at audio frequencies and low sound propagation velocity,
    suspension means for sporting said damper disc for movement from a first position adjacent to said encoded disc and a second position supported on said encoded disc in mechanically coupled contact therewith,
    means for registering said damper disc in axial alignment with said spindle and said encoded disc when the same is adjacent thereto,
    said suspension means further serving to support said damper in contact with said encoded disc and spindle for rotation therewith when said damper is coupled with said encoded disc.

12. A player as in claim 11 wherein said damper disc is made of plastic.

13. A player as in claim 11 wherein said damper disc is made of glass or carbon fiber filled reinforced epoxy plastic.

14. The player as in claim 11 wherein said damper disc is made with a predetermined thickness about the same as the thickness of a disc and is constructed with a diameter extending over at least the entire diameter of said disc.

15. The player as in claim 11 wherein said damper disc is made of solid fluorocarbon plastic.

16. The player as in claim 11 wherein said damper disc is made of a material which is optically opaque and optically absorptive.

17. In combination with an optically encoded disc, a damping layer adhered to the upper side of said disc and extending at least over the tracks encoded thereon, said layer being made of a sound absorbent plastic having significant internal loss at audio frequencies and low sound propagation velocity and being light absorptive, and means for bonding said layer into intimate acoustic and vibration coupled contact with said disc.

18. The combination as in claim 17 in which said damping layer is made of fiberglass fiber or carbon fiber filled epoxy plastic.

19. The combination as in claim 17 in which said damping layer is made of solid fluorocarbon plastic.

20. A method for changing the mechanical Q of a optically encoded disc player comprising:
   providing a damper disc made of vibration absorbing material and having dimension comparable to the disc,
   mounting said damper disc on top of the disc in acoustic and vibration coupled contact therewith while playing said disc.

21. In combination
   a disc having an optically encoded, light readable side and an opposite side,
   a damping layer adhered to said opposite side and extending at least over the areas opposed to areas that are optically encoded,
   said damping layer being made of a material which is sound absorbent with significant internal loss at audio frequencies and which has low sound propagation velocity,
   said damping layer being further made of material which is absorptive of the light used to read said optically encoded side,
   means for bonding said damping layer to the opposite side of said disc in acoustic and vibration contact therewith.

22. In a method for changing the playback response of a system for optically reading an optically encoded side of a disc while rotating the same relative to a read light beam to read the optically encoded side thereof,
   providing a damping disc made of a material which is sound absorbent with significant internal loss at audio frequencies and which has low sound propagation velocity,
   further providing that said damping disc be made with material which is absorptive to the light used to read the optically encoded disc,
   mounting said damper disc to the other side of the optically encoded disc in acoustic and vibration coupled contact therewith while playing said optically encoded disc.

23. A disc damper system for use with an optically encoded disc, said damper comprising,
   a substantially flat damper disc of material,
   means incorporated in said damper disc for absorbing light,
   means for mounting said damper disc in acoustic and vibration coupled contact with said optically encoded disc on the side away from that optically encoded being read while playing the same.

* * * * *